No. 656,641. Patented Aug. 28, 1900.
F. T. HARRINGTON.
VEHICLE BRAKE.
(Application filed June 2, 1899.)
(No Model.) 2 Sheets—Sheet 1.
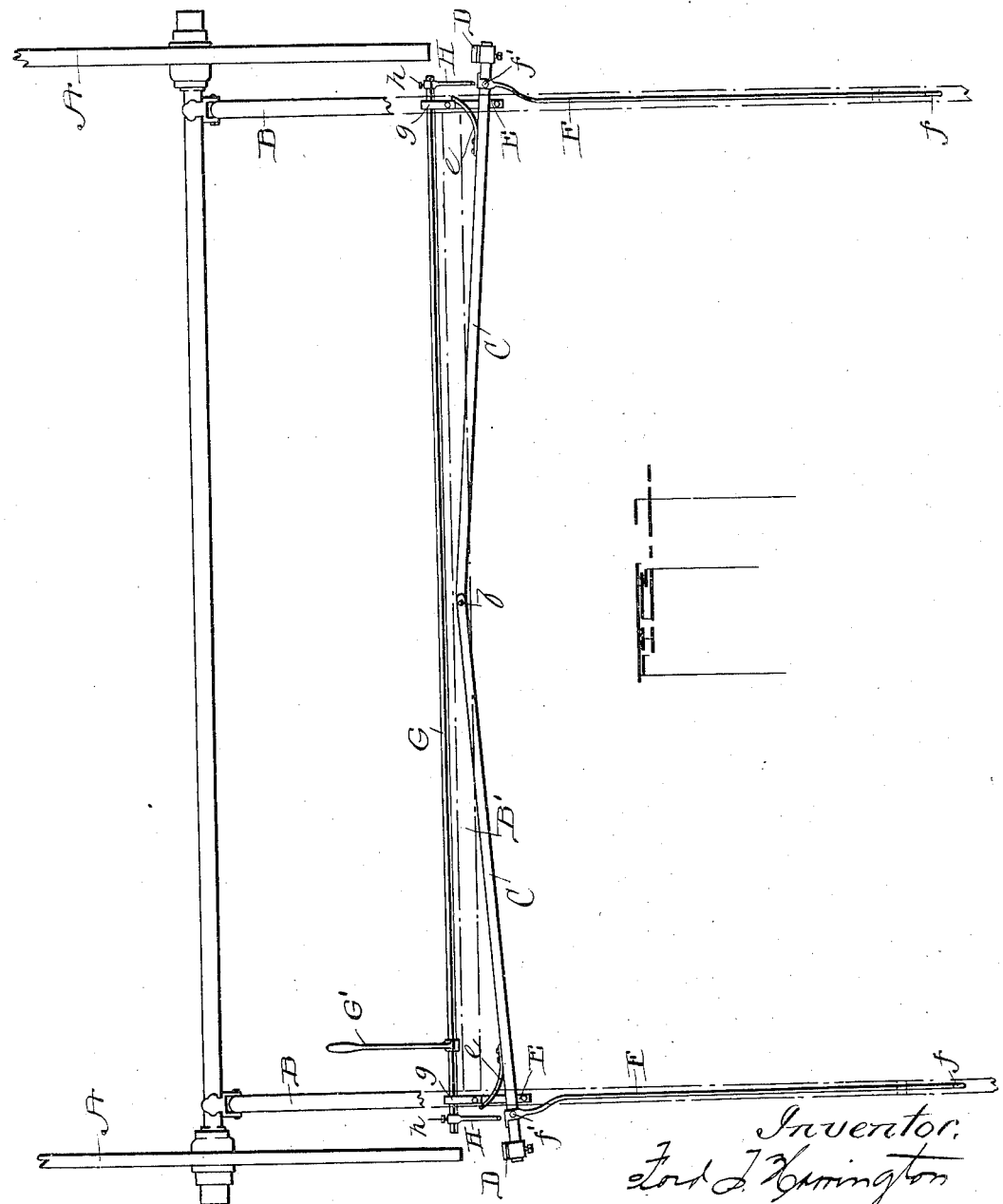

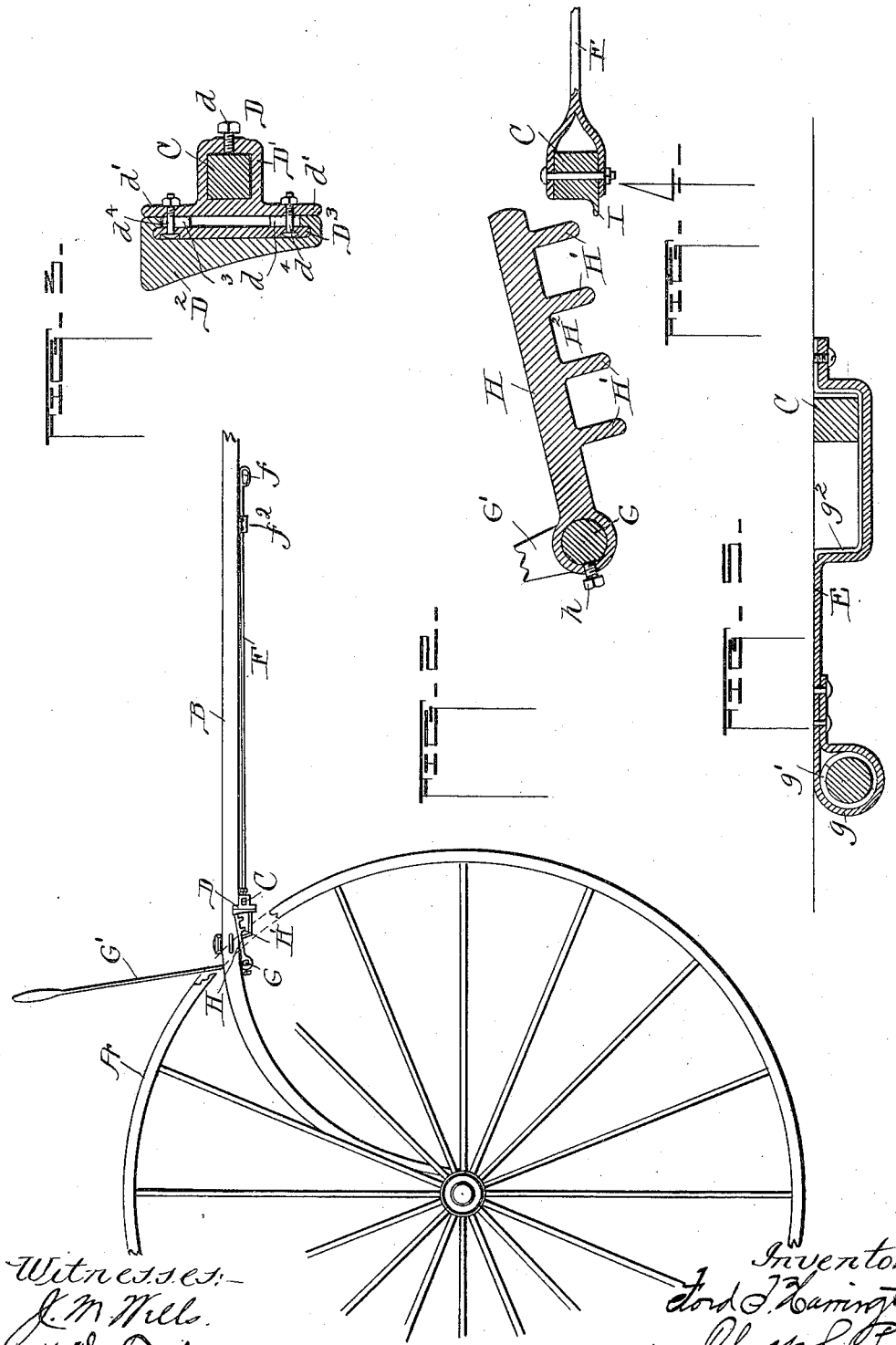

UNITED STATES PATENT OFFICE.

FORD T. HARRINGTON, OF BUSHNELL, ILLINOIS.

VEHICLE-BRAKE.

SPECIFICATION forming part of Letters Patent No. 656,641, dated August 28, 1900.

Application filed June 2, 1899. Serial No. 719,138. (No model.)

*To all whom it may concern:*

Be it known that I, FORD T. HARRINGTON, a citizen of the United States, residing at Bushnell, in the county of McDonough and State of Illinois, have invented certain new and useful Improvements in Vehicle-Brakes; and I do hereby declare that the following is a full, clear, and exact description of the invention, which will enable others skilled in the art to which it appertains to make and use the same.

My invention relates to certain new and useful improvements in brakes for vehicles by means of which a brake is provided being simple in construction, durable, and cheap at first cost.

One object of my improvement is to provide for the automatic braking of a vehicle by means of the animal drawing the same when descending a hill and that is actuated either by the holding back of the team or by the running of the vehicle upon the team.

A further object is in the provision of suitable mechanism purposed when actuated to throw the brakes out of action, so that the team may be backed without setting the brakes.

It further consists of suitable operative parts for increasing the pressure of the brake-shoes and for locking the brake-levers so as to hold the brake-shoes firmly against the wheels.

Another object of my invention is to provide a brake-shoe which is of a novel construction having certain features which are deemed necessary to the end that a brake of this character may in its operation be successful and which will hereinafter be more fully described.

It has been my aim in constructing a brake of this character to eliminate certain features which tend to mar the looks of a vehicle and add weight thereto and which by the motion of the vehicle and the operation of the several parts make considerable noise, making it disagreeable to the occupant thereof. By the arrangement the several parts herein contained as my improvement absolutely all noise is avoided and done away with, the weight lessened, and the looks of the vehicle not marred in the least, owing to the manner of carrying the parts, and the operation of the brake-shoe being more successful than heretofore used, owing to the manner of constructing the same.

My invention has for its further object the lateral adjustment of parts, such as the brake-shoe and the mechanism for locking or retarding the movement of the brake-levers. This adjustment is one of the essential features which must be taken into consideration, owing to the different widths of vehicles known as "standard" and "narrow" widths.

That my invention may be more fully understood, reference is had to the accompanying drawings, in which—

Figure 1 is a plan view of a portion of the front end of a vehicle shown partially in dotted lines with my improvements added thereto and shown in full lines, it being understood that the parts are adapted to be carried beneath the shafts. Fig. 2 is an elevation of Fig. 1. Fig. 3 is an enlarged cross-section of the brake-shoe. Fig. 4 is an enlarged cross-section showing in detail the brake-lever and the mechanism for retarding the backward movement of the same and for locking the same when the brake-shoe is in contact with the wheel. Fig. 5 is an enlarged cross-section in detail showing the manner of constructing and carrying certain operative parts of my device.

In the drawings like letters of reference indicate the several corresponding parts.

The vehicle proper is not shown in the drawings, only the forward wheels thereof, which are referred to as A A.

B B are the shafts or thills, broken away at their forward ends, and B' the cross-piece, which unites the shafts A A.

C C are brake-levers pivoted at their inner ends beneath the cross-piece B' at *b* by means of the fulcrum-pin which holds the singletree in position above. These levers have square end portions and carry the brake-shoes D D, which are laterally movable thereon to adapt the same when adjusted to vehicles of different widths, as above described, as to place them in line of engagement with the wheels, the detail construction and operation of which will be hereinafter described. The brake-levers are supported beneath the shafts in the brackets E E, which also serve a further purpose to be described. The construction of the brackets is such as to permit the levers to be moved longitudinally in relation to the shafts at their outer ends.

e e are flat pressure-springs secured to the rear of the brake-levers and having a bearing relation with the brackets E E, the springs being carried between the shafts and the brackets, exerting a pressure which holds the brake, as shown, in its normal position, which is in disengagement with the vehicle-wheels A A.

F shows operating-rods longitudinally arranged beneath the shafts, as shown. The forward ends, which are at a point where the holdback-straps are purposed to be secured, are provided with the hooked or looped ends $f$, which are adapted to have the holdback-straps fastened thereto. The rear ends of the rods are suitably connected to the brake-lever at $f'$ and the front ends are supported in the brackets $f^2$ and are adapted to slide back and forth therein.

G is a rod carried across the shafts and beneath the same, as shown in the drawings, and is journaled in a tight box $g$, formed by an extension from the brackets E E. The bearing-faces of these journals are provided with the leather stuffing $g'$, and likewise the bearing-surface of the brackets in which the brake-levers move are faced with leather, as at $g^2$, providing, as is readily seen, a noiseless brake, there being no rubbing of parts nor grating sounds, as is customary. The rod G is provided with the operating-lever G', carried so as to be within easy reach of the operator and is provided to enable the operator to actuate the rod G when he desires to cause the brake-shoes to impinge firmly the wheel-rims or when he desires to throw the brakes out of action—as, for instance, should the driver desire to back on level ground.

H H are operating-fingers laterally adjustable on the rod G and secured thereto by means of the thumb-screws $h$. The fingers are purposed to extend out from the rod H, as shown in Fig. 4, and are provided with the depending lugs H', which form pockets H² between them adapted to engage the brake-levers. The same are raised or lowered by means of the operating-lever G'. When it is desired to hold the brake-shoes firmly against the wheels, the fingers H are raised and then allowed to drop over the lever at a time when the rods F have been actuated so as to set the brake-shoes against the wheels, and the pocket H², which in the judgment of the driver will be sufficient to cause enough pressure, is allowed to engage with the same. When backing on level ground or for any reason whatever it is desired to hold the brakes away from the wheels, the driver may move the operating-lever G' and cause the end of the finger H to engage with the rear face of the lever, which will hold the brakes away from the wheels. A lug I is shown extending out from the face of the lever and is purposed to form a stop for the finger to insure its contact with the lever for holding the brake-shoes away from the wheels.

The brake-shoes D D, which are laterally adjustable or movable on the brake-levers, are secured thereto by means of the thumb-screws $d$. These shoes consist of the rectangular-shaped blocks D', having the flanges $d'$.

D² shows what are termed "rubbers," made substantially of leather or like material and having the extensions $d^3$ and slotted, as at $d^5$, which are carried over the ends of a plate $d^3$, which serves as a core for the rubbers. The rubber is brought to bear against the block D and bolted to the flanges thereof by means of the bolts $d^4$, carried through the plate D³ and the ends of the rubber, as shown in Fig. 3. This form of rubber serves as a cushion to bear against the wheel, and by reason of the core and the manner of securing the same thereto and then to the flanges of the block gives no chance for a scraping sound against the rim of the wheels as the same begin to wear, serving the purpose for what it is intended longer, giving better satisfaction, and insuring a brake which is durable and practical.

While I have shown and described certain means of securing my parts together and for operating the brake-levers and for engaging the brake-levers to insure a steady pressure of the brake-shoes on the wheels and for preventing the brakes to engage with the wheels when backing on level ground, I do not wish to limit myself to the exact construction, as other equivalent means may be provided operating substantially and through the same mechanism as I have employed for accomplishing substantially what I accomplish through the mechanism herein shown.

Having thus fully described my invention, what I claim, and desire to secure by Letters Patent, is—

1. In a brake, the combination with a pair of shafts, brake-levers transversely carried and fulcrumed on a common center, push-rods carried longitudinally beneath the shafts, and provided with bifurcated ends and suitably fastened to the brake-rods, of a transversely-carried rod journaled beneath the shafts and thereto at the rear of said brake-levers, and of means carried thereby for engaging said levers substantially to hold the brake-shoes in contact with the wheels or from the same as desired.

2. In a brake, the combination with a pair of shafts, and brake-levers suitably fulcrumed to the crosstree, brake-shoes laterally adjustable thereon, reciprocating push-rods having bifurcated rear ends suitably fastened to said levers, of a rod journaled at the rear of said levers and provided with a lever for actuating said rod, laterally-extended fingers or arms adjustable on said rod, provided with depending lugs or stops forming pockets for the engagement of said levers to cause a firm engagement of the brake-shoes with the wheels, means for holding the brake-shoes normally off of the wheels, or to set the same against action by the reciprocated rods, all substantially as and for the purpose set forth.

3. In a brake, the combination with a pair of shafts, brake-levers pivoted to the crosstree thereof and suitable push-rods for actuating said brake-levers, of a rod journaled beneath said shaft and provided with laterally-adjustable arms having graduated means for engaging said levers whereby the pressure of the brake-shoes on the wheels may be varied as they are actuated through suitable means, and of the means for actuating said rod, all substantially as described.

4. In a brake, in combination with a pair of shafts, the levers C, provided with adjustable brake-shoes D, and the springs $c$, push-rods F, having bifurcated rear ends pivotally secured to said brake-levers C, of the rod G, operating-lever G', and the adjustably-secured arms H, actuated by the movement of said rod G, and provided with the depending fingers H', forming pockets $H^2$, for the purpose set forth, and in the provision of the lug I, all substantially as shown.

In testimony whereof I affix my signature in presence of two witnesses.

FORD T. HARRINGTON.

Witnesses:
D. HAWES,
LAURA J. HARRINGTON.